United States Patent

Zwirn et al.

[15] 3,702,405

[45] Nov. 7, 1972

[54] ELECTRONICALLY VARIABLE CAPACITANCE

[72] Inventors: Robert Zwirn, Encino; Ralph E. Johnson, Canoga Park; Jacob M. Sacks, Palos Verdes Peninsula, all of Calif.

[73] Assignee: The United States of America as represented by the Secretary of the Air Force

[22] Filed: Nov. 17, 1971

[21] Appl. No.: 199,684

[52] U.S. Cl.........................307/109, 320/1, 323/74, 333/80 T

[51] Int. Cl...............................................H03h 7/10

[58] Field of Search..........307/109; 320/1; 333/80 T; 334/14, 78; 323/74

[56] References Cited

UNITED STATES PATENTS 2,953,734 9/1960 Leyde............................320/1

3,211,984 10/1965 Jones............................320/1

3,551,846 12/1970 Hansen....................333/80 T

*Primary Examiner*—Stanley M. Urynowicz, Jr.

*Assistant Examiner*—Stuart Hecker

*Attorney*—Harry A. Herbert, Jr. et al.

[57] ABSTRACT

An electronically controlled capacitor utilizing an analog multiplier and to obtain an effect analogous to the Miller Effect. An input signal is fed through an input resistor which is connected to a fixed capacitor which is in turn coupled to a transistor in a common base configuration. An analog multiplier is capacitively coupled to the transistor's collector which drives the input side of the fixed capacitor through an output resistor.

3 Claims, 5 Drawing Figures

INVENTORS
ROBERT ZWIRN
RALPH E. JOHNSON
BY JACOB M. SACKS
Harry A. Herbert Jr.
and
Julian L. Siegel
ATTORNEYS

ELECTRONICALLY VARIABLE CAPACITANCE

BACKGROUND OF THE INVENTION

This invention relates to electronically controlled capacitors, and more particularly to a novel application of the Miller effect.

The present invention is an electronically controlled capacitor which is useful in suppressing video corresponding to clutter whose dimensions are significantly smaller than the target dimensions.

In the past, the problem of varying the capacitances for the purpose of suppressing video clutter was approached by the discrete addition of capacitors to the circuit at pre-set target dimensions. A discussion of this technique can be found in the article, Development of Alternate Tracker for Maverick Missile, Hughes Aircraft Report No. P69-400, prepared by R. Zwirn, p. 4–19.

The present invention overcomes the limitations of the prior art because the control is continuous and linear, the value of capacitance is always optimum for the instantaneous target dimensions. Also the tracking output is smooth, as opposed to containing steps which occur due to instantaneous changes in delay when capacitors are switched in.

SUMMARY OF THE INVENTION

The circuit of the present invention is related to the well-known Miller effect with some significant differences. The Miller amplifier drives the bottom of a capacitor while in this invention an analog multiplier circuit drives the top in relation to the input. Also the Miller effect output is related to the voltage applied to the capacitor while in the invention the analog multiplier circuit output is related to the current out of the capacitor and the analog multiplier circuit is AC coupled.

It is therefore an object of the invention to provide an improved Miller effect type circuit useful for suppressing video signals in radar whose dimensions are significantly smaller than the target dimensions.

It is another object to provide a Miller effect type amplifier that provides control which is continuous and linear.

It is still another object to provide a Miller effect type amplifier in which the value of the variable capacitance is always optimum for the instantaneous target dimensions.

These and other advantages, features and objects of the invention will become more apparent from the following description taken in connection with the illustrative embodiments in the accompanying drawings.

DETAILED DESCRIPTION OF THE PREFERRED EMBODIMENTS

Figure 1:
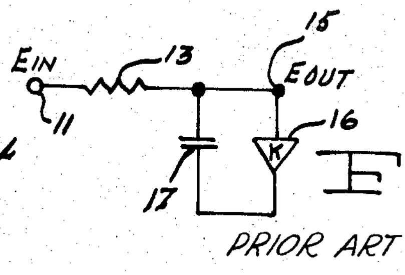
FIG. 1 PRIOR ART
FIGS 1 and 2 are circuit diagrams used for the explanation of the conventional Miller effect.
Figure 2:
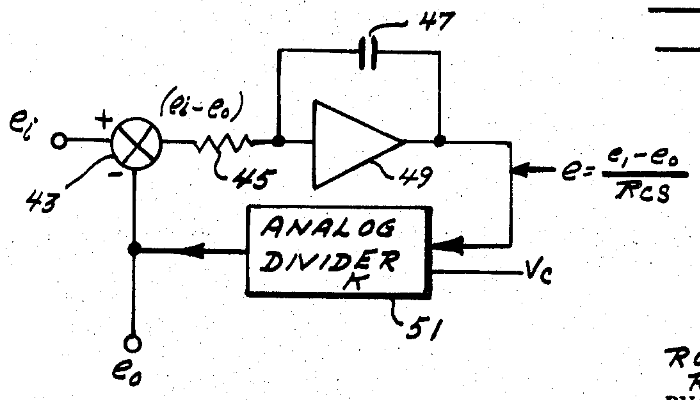
FIG. 2 PRIOR ART

Referring to FIG. 1, there is shown a simplified circuit showing the Miller effect. A voltage $E_{in}$ is fed an input 11 through resistor 13 and voltage $E_{out}$ is obtained at output 15. Amplifier 16 having an amplifying factor of $K$ drives the bottom of capacitor 17. The circuit of FIG. 1 is equivalent to the circuit of FIG. 2 which now includes effective capacitor 19 the value thereof depending on the value of $K$ and the value of capacitor 17 with $C_{EFF}=C(1+K)$.

Figure 3:
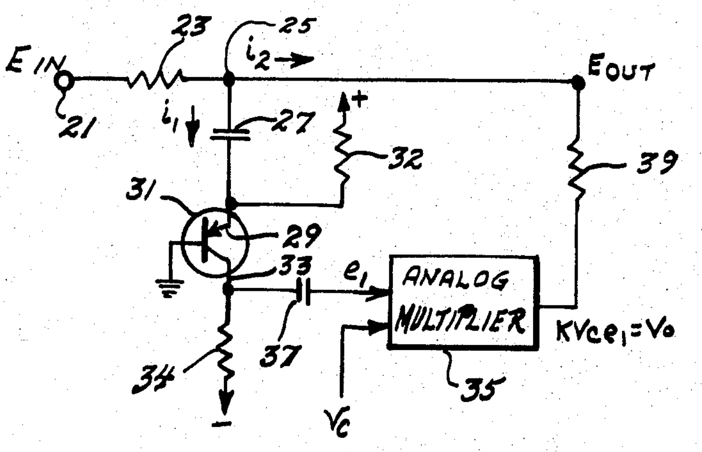
FIG. 3 is a circuit diagram showing a first embodiment of the invention.
Figure 4:
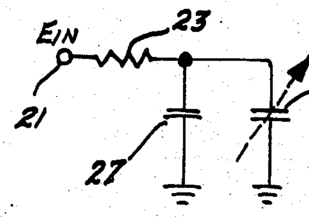
FIG. 4 is a circuit diagram showing an equivalent circuit to FIG. 3.

An embodiment of the invention is shown in FIG. 3 where the voltage input $E_{in}$ is impressed at point 21 through input resistor 23. At node 25 the circuit divides and the current is then designated as $i_1$ and $i_2$. Capacitor 27 is connected between node 25 and emitter 29 of transistor 31. Resistors 32 and 34 control the bias of transistor 31. The output of transistor 31 taken from collector 33 is coupled to analog multiplier 35 via capacitor 37. The input to analog multiplier 35 is designated as $e_1$. Control voltage $V_c$ is also fed to analog multiplier 35 and its output drives the top of capacitor 27 through output resistor 39 which has the same value as input resistor 23. The equivalent circuit of FIG. 3 is shown in FIG. 4 which now includes effective variable capacitor 41 in parallel with fixed capacitor 27.

The following equations describe circuit operation.

$$i_{in}=(E_{in}-E_{out})/R=i_l+i_2=E_{out}C_s+(E_{out}-KV_c e_1)/R$$

$$e_1=-i_1 r=-E_{out}C_s r$$

$$E_{in}-E_{out}=E_{out}C_s R+E_{out}+KV_c E_{out}C_s r$$

$$E_{out}/E_{in}=1/(C_s R+C_s KV_c r+2^2)$$

$$E_{out}/E_{in}=\tfrac{1}{2}\,1/[1+KV_c\,(r/R)\,]/(C_s R\,2+1)\,.$$

This is the same form as a simple lag network with a capacitor composed of a fixed value plus a component which is a function of control voltage. By properly selecting $K$, $V_c$, $R$, and $r$, the capacitance can be made to vary linearly over a large dynamic range (typically greater than 60:1).

Figure 5:
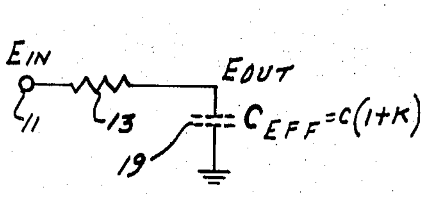
FIG. 5 is a circuit diagram showing a second embodiment of the invention.

An alternate embodiment of the invention is shown in FIG. 5 in which input voltage $e_1$ is fed to mixer 43 and then to resistor 45 followed by the parallel circuit of capacitor 47 and amplifier 49. The output or amplifier 49 is fed to analog divider 51 which is also fed by control voltage $V_c$. The output of analog divider 51 is then fed to mixer 43. The analog divider is composed of an analog multiplier and an operational amplifier having amplifying factor $K$.

What is claimed is:

1. A capacitance control circuit comprising:
   a. a capacitor having first and second terminals;
   b. an input resistor connected to the first terminal of the capacitor;
   c. a transistor having an emitter and collector, the emitter being connected to the second terminal of the capacitor;
   d. an analog multiplier capacitively coupled to the collector of the transistor; and
   e. an output resistor connected between the first terminal of the capacitor and the output of the analog multiplier.

2. A capacitance control circuit comprising:
   a. a mixer having first and second inputs;

b. a resistor fed by the output of the mixer;
c. an amplifier fed by the output of the resistor;
d. a capacitor in shunt with the amplifier; and
e. an analog divider fed by the amplifier with the output of the analog divider comprising the second input of the mixer.

3. A capacitance control circuit according to claim 2 wherein the analog divider comprises an operational amplifier and an analog multiplier.

* * * * *